United States Patent [19]

Leiber

[11] Patent Number: 4,843,819
[45] Date of Patent: Jul. 4, 1989

[54] HYDRAULIC BRAKE BOOSTER WITH PARALLEL BOOSTER PISTONS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 149,826

[22] Filed: Jan. 29, 1988

Related U.S. Application Data

[62] Division of Ser. No. 788,287, Oct. 17, 1985, Pat. No. 4,736,588.

[30] Foreign Application Priority Data

Dec. 8, 1984 [DE] Fed. Rep. of Germany ....... 3444829

[51] Int. Cl.⁴ .................... B60T 13/12; B60T 11/20; F15B 9/16
[52] U.S. Cl. ................................ 60/550; 60/567; 60/581
[58] Field of Search .............. 60/547.1, 550, 562, 60/567, 570, 574, 576, 580, 581, 593

[56] References Cited

U.S. PATENT DOCUMENTS

| 4,137,718 | 2/1979 | Belart | 60/562 X |
| 4,225,022 | 9/1980 | Belart | 60/576 X |
| 4,244,185 | 1/1981 | Belart | 60/550 |
| 4,263,784 | 4/1986 | Steffes | 60/547.1 |
| 4,505,116 | 3/1985 | Weiler et al. | 60/547.1 X |
| 4,543,791 | 10/1985 | Burgdorf et al. | 60/550 |
| 4,674,805 | 6/1987 | Leiber | 303/95 X |

FOREIGN PATENT DOCUMENTS

| 698374 | 10/1940 | Fed. Rep. of Germany | 60/574 |
| 2702820 | 7/1978 | Fed. Rep. of Germany | 60/581 |
| 2947657 | 7/1981 | Fed. Rep. of Germany | 60/547.1 |
| 1043280 | 6/1953 | France | 60/576 |

Primary Examiner—Robert E. Garrett
Assistant Examiner—George Kapsalas
Attorney, Agent, or Firm—Edwin E. Greigg

[57] ABSTRACT

A brake booster has a first booster cylinder and a booster piston disposed in it for displacing a master cylinder piston to pressurize a brake circuit. A tappet displaces the first booster piston directly if boost fluid pressure is inadequate. A second booster piston in a parallel booster cylinder drives a pump piston which also pressurizes the brake circuit. The second booster piston and the pump piston have hydraulically effective surface areas which are matched to one another so as to have a larger boosting ratio than the first booster piston and master cylinder piston. Forward displacement of the second booster piston causes a bent arm to contact and push the first booster piston forward. If the boost pressure supply apparatus fails, then only the first booster piston and the master cylinder piston are displaced by the brake pedal; brake pedal travel increases considerably.

4 Claims, 2 Drawing Sheets

HYDRAULIC BRAKE BOOSTER WITH PARALLEL BOOSTER PISTONS

This application is a division of application Ser. No. 788,287 filed on Oct. 17, 1985, and now U.S. Pat. No. 4,736,588, issued Apr. 12, 1988.

BACKGROUND OF THE INVENTION

The invention is based on a brake booster as generally defined hereinafter. Brake boosters are already known (German Offenlegungsschrift No. 32 40 404), in which the brake valves connected to pressure supply apparatuses are built into displaceable booster pistons, so that coaxially aligned tappets provided for actuating the brake valves travel substantially equally long displacement distances as do the booster pistons. It is also possible to dispose a brake valve next to the associated booster piston (German Offenlegungsschrift No. 32 32 051), and to actuate it via a lever mechanism that is coupled with the booster piston and the coaxially aligned tappet. In this brake booster as well, the displacement paths of the booster piston are substantially equal in length to those of the tappet. The diameters of the master cylinder pistons, which are displaced by means of such brake boosters, are selected such that if the pressure supply apparatuses fail then the force of the operator's foot, which is exerted via the brake pedals, tappets and the booster pistons upon the master cylinder piston are adequate to generally sufficiently high emergency braking forces. This has the disadvantage, however, especially when used with disk brakes, of requiring very long pedal travel paths as well as greater length of foot movement or pedal forces.

SUMMARY OF THE INVENTION

The brake booster according to the invention has the advantage over the prior art that during braking with hydraulic brake boosting, shorter brake pedal travel is sufficient than if the pressure supply were to fail. This makes braking more convenient and shortens the response times of the brakes, which especially when sudden full braking is required shortens the stopping distance. There is also the advantage that a failure of the pressure supply apparatus is indicated via longer brake pedal travel. The ratios of the shorter brake pedal travel distances to the longer ones are known by the term "translation jump". In comparison with conventional brake boosters, lesser pedal forces are required to attain the same brake pressure.

The brake booster according to this invention has the advantage that an early blockage of brake circuits with respect to the associated refill containers takes place; as a result, the maximum possible displacement path of the second booster piston is virtually fully available to generate booster power. The brake booster also has the advantage that the first master cylinder piston can be short in structure, despite the second booster piston, which is displaceable on it, and despite the pump piston. Further characteristics revealed herein have the advantage that the brake booster, despite the additional booster cylinder, can be approximately just as short as previously known brake boosters, yet if there is a failure, greater and even considerably greater foot pedal forces are not required. In other words, in the prior art the forces needed to operate the brakes are much greater and quite frequently a lot greater than that force which is required by the apparatus disclosed herein.

Further embodiments disclosed have the advantage that they considerably shorten the structural length of the brake booster. Also another further advantage is that the brake booster acts as a so-called follow-up booster.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows another exemplary embodiment, again in longitudinal section.

DESCRIPTION OF THE PREFERRED EMBODIMENTS

Figure 1:
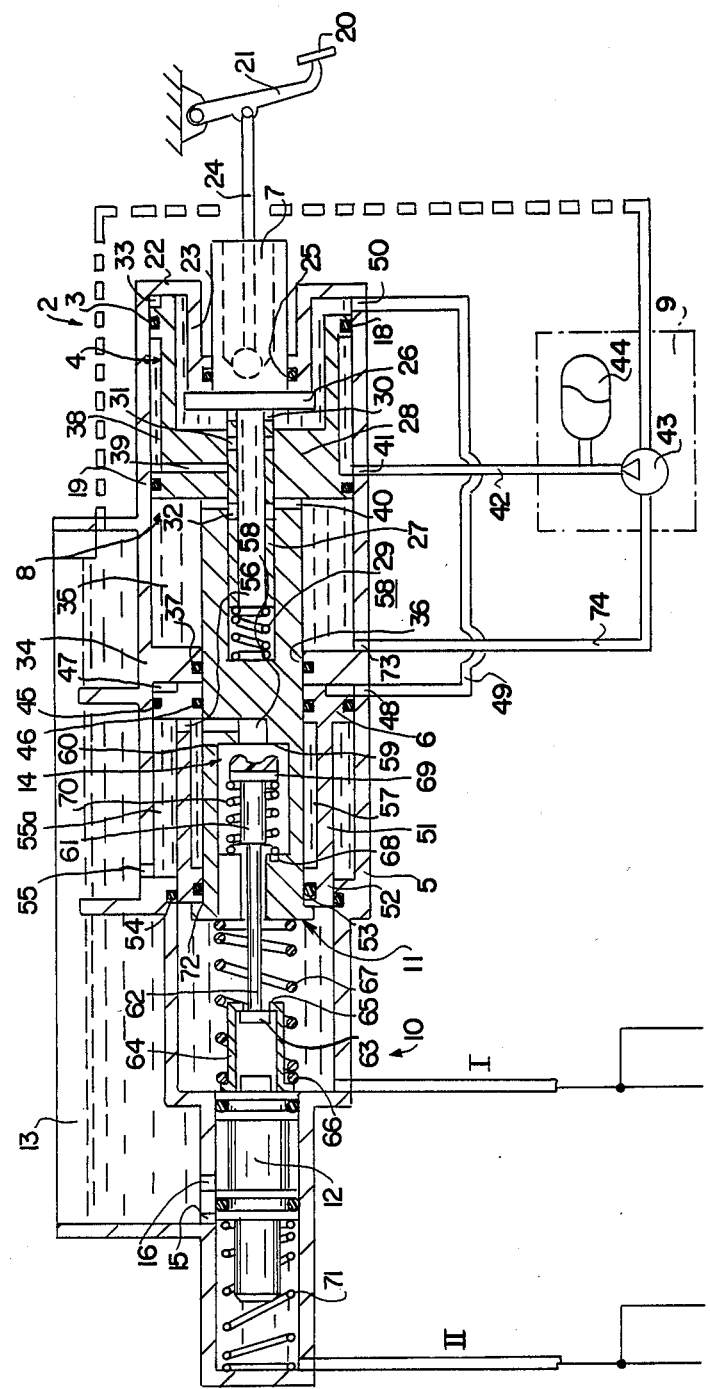
FIG. 1 shows a first exemplary embodiment of the brake booster according to the invention in a longitudinal section; and, FIG. 2 shows a second exemplary embodiment of the brake booster in longitudinal section.

The first exemplary embodiment of the brake booster 2 according to the invention as shown in FIG. 1 has a first booster cylinder 3, a first booster piston 4, a second booster cylinder 5, a second booster piston 6, a tappet 7 and a brake valve 8. The brake booster 2 is supplied by a pressure supply apparatus 9 and is combined with a master brake cylinder 10. The master brake cylinder 10 has a first master cylinder piston 11, a second master cylinder piston 12, a refill container 13, a filling valve 14, refill openings 15, 16 and two brake circuits I and II.

The first booster cylinder 3 receives the first booster piston 4, which is substantially cup—shaped, in a longitudinally displaceable manner. The first booster piston 4 has sealing rings 18, 19 near its ends, which press in a sealing manner against the first booster cylinder 3. An end wall 22 is disposed on one end of the first booster cylinder 3, which is oriented toward a brake pedal lever 21 bearing a brake pedal 20. From this end wall 22, a tube 23 extends toward the master cylinder 10. This tube 23 at least partially encompasses the tappet 7 and forms a bearing for it. The tappet 7 is displaceable toward the master cylinder 10 by means of the brake pedal 20 via the brake pedal lever 21 and a pedal rod 24. A sealing ring 25 is inserted into the tube 23 and sealingly surrounds the tappet 7. The tappet 7 is combined with a stop collar 26, which is located inside the first booster cylinder 3.

The brake valve 8 has a tubular control slide 27, which is aligned coaxially with the tappet 7 and joined with it and extends into the first booster cylinder 3, and also has a control sleeve 28, which is combined into a structural unit with the first booster piston 4. A soft restoring spring 29 is disposed such that it urges the control slide 27 and the tappet 7 in the direction the brake pedal lever 21. Directly beside the stop collar 26, the tubular control slide 27 has radially extending compensation bores 30. Spaced apart from these compensation bores 30, offset toward the master cylinder 10, are, first, radially extending inflow bores 31 and finally radially extending relief bores 32. Between the first booster piston 4 and the end wall 22, a first booster chamber 33 is defined by the first booster cylinder 3. Toward the master cylinder, the first booster cylinder 3 is defined by an end wall 34. Between this end wall 34 and the first booster piston 4 there is an auxiliary chamber 35. The end wall 34 has a bore 36 coaxial with the first booster cylinder 3, and the first master cylinder piston 11, which is rod-like in embodiment, passes all the way through this bore 36 as far as the first booster piston 4. A sealing ring 37 borne by the end wall 34 sealingly surrounds the first master cylinder piston 11. The master cylinder piston 11 is rigidly joined to the first booster piston 4. Between the sealing rings 18 and 19, the first booster piston 4 has a circumferential groove 38. A connecting bore 39 begins adjacent to this circumferential groove 38 and extends as far as the circumference of the tubular control slide 27. Adjacent to the first booster piston 4, outflow bores 40 extend crosswise through the first master cylinder bore 11. Beside the sealing ring 19 and coinciding with the circumferential groove 38 of the first booster piston 4, the first booster cylinder 3 has a supply connection 41. This supply connection 41 communicates via a line 42 with the pressure supply apparatus 9. The pressure supply apparatus is embodied in a manner known per se, so it is sufficient herein to name a pump 43 and a pressure reservoir 44 as its essential components.

In coaxial alignment with the first booster cylinder 3, the second booster cylinder 5 adjoins the end wall 34 in axial alignment with the first booster cylinder 3. The second booster cylinder 5 receives the second booster piston 6. The second booster piston 6 is embodied as an annular body and is slidably supported on the first master cylinder piston 11 and bears two sealing rings 45 and 46. The sealing ring 45 rests on the second booster cylinder 5. The sealing ring 46 sealingly encompasses the rod-like first master cylinder piston 11. Between the second booster piston 6 and the end wall 34, the second booster cylinder 5 surrounds a second booster chamber 47, which is provided with a connection 48 adjoining the end wall 34. From this connection 48, a line 49 leads to a connection 50, which discharges into the first booster chamber 33 adjacent to the end wall 22.

A pump piston 52 is also embodied as an annular piston and is slidably supported on the master cylinder piston 11. A tubular intermediate piece 51 is molded onto the pump piston 52, having the same outer diameter as the pump piston 52 and joining it with the second booster piston 6. The pump piston 52 receives a sealing ring 53, which like the sealing ring 46 sealingly encompasses the first master cylinder piston 11. The master cylinder 10 has an additional sealing ring 54, which surrounds the pump piston 52 protruding into it or, when the pump piston 52 is displaced, surrounds the tubular intermediate piece 51 which has the same diameter. Near the sealing ring 54, the second booster cylinder 5 has a connecting bore 55, which opens toward the refill container 13 and an annular chamber 55a enclosed between the booster cylinder 5, the second booster piston 6 and the intermediate piece 51. Adjacent to the second booster piston 6, the tubular intermediate piece 51 is provided with a transverse bore 56, so that a second annular chamber 57, located between the intermediate piece 51 and the first master cylinder piston 11 and closed off with respect to the master cylinder 10, communicates with the refill container 13 via the bore 55 in the booster cylinder 5 which extends from the first annular chamber 55a. The filling valve 14 disposed in the first master cylinder piston 11 communicates via a conduit 58 in the first master cylinder piston 11 with this second annular chamber 57. The conduit 58 terminates at a valve seat 59 of the filling valve 14. A closing element 60 is associated with the valve seat 59. This closing element is secured via a supporting disk 69 on a rod 61, which is extended in the form of a stem 62 in the direction of the second master cylinder piston 12; on its end, the stem 62 has a head 63. The head 63 is located inside a sheath 64, which has a collar 65 pointing inward and surrounding the stem 62 with play. The sheath 64 also has a radially outwardly offstanding flange 66, with which it rests on the second master cylinder piston 12. A spreader spring 67 is installed between this flange 66 and the first master cylinder piston 11. Inside the first master cylinder piston 11, there is at least one stop protrusion 68. This stop protrusion 68, the rod 61, the stem 62, the head 63 and the sheath 64 limit the expansibility of the spreader spring 67. A closing spring 70 is installed with initial stress between the stop protrusion 68 and the supporting disk 69 and urges the second master cylinder piston 12 toward the first master cylinder piston 11. Under the influence of the restoring spring 71, the second master cylinder piston 12 moves, when the brake pedal 20 is not actuated, into a position in which the refill opening 15 connects the refill container 13 and the brake circuit II. The first master cylinder piston 11 has a collar 72 acting as a coupling means, which stands radially away from the first master cylinder piston 11 between the pump piston 52 and the spreader spring 67. Because of this collar 72, the restoring spring 71 and the spreader spring 67, via the first master cylinder piston 11, are capable of displacing the pump piston 52 and the associated second booster piston 6 into a starting position. The starting position is defined by the end wall 34, which forms an axial stop.

MODE OF OPERATION OF THE FIRST EXEMPLARY EMBODIMENT

If the pressure supply apparatus 9 is switched off or has failed and if its pressure reservoir 44 is empty, then braking can be effected without brake boosting. To this end, the tappet 7 is moved in the direction of the master cylinder 10 via the brake pedal lever 21 and the pedal rod 24. As a result, the tappet 7 finally, upon being sufficiently displaced, presses with its stop collar 26 against the first booster piston 4. Because of its rigid connection with the first booster piston 4, the first master cylinder piston 11 is displaced toward the second master cylinder piston 12. The spreader spring 67 accordingly displaces the second master cylinder 12 as well, causing it to overtake the refill opening 15 and thereby close off the brake circuit II relative to the refill container 13. A pressure buildup begins in the brake circuit II, which offers increasing resistance to the spreader spring 67, which is therefore elastically compressed. As a result, the closing spring 70 becomes effective and presses the closing element 60 against the valve seat 59. As a result, the brake circuit I is also blocked off with respect to the refill container 13. A further displacement of the brake pedal 20 effects a further displacement of the first master cylinder piston 11, causing the piston 11 to generate increasing braking pressures in the brake circuits I and II. The brake circuits I and II terminate in wheel brake cylinders, not shown. These wheel brake cylinders convert the braking pressures into braking forces. To attain braking forces of a desired magnitude, a stroke of the brake pedal 20 is required, which is dependent on the volumetric capacity of the wheel brake cylinders, the elasticity of the captive pressure medium, and the cross-sectional area of the first master cylinder piston 11. The cross-sectional area of the first master cylinder piston 11 and the dimensions of the brake pedal lever 21 are selected such that by actuating the brake pedal it is possible to generate sufficiently great braking pressures for emergency braking in brake circuits I and II. When these brake pressures are generated, the brake pressure prevailing in brake circuit I is exerted on the pump piston 52, causing it to pressure the second booster piston 6 against the end wall 34. In braking without brake boosting, the work of positive displacement that is performed in the master brake cylinder 10 and is required for the pressure buildup is therefore generated solely by means of the brake pedal 20, via the master cylinder brake piston 11. Because undesirably long displacement paths of the master cylinder piston 11 are necessary for performing the work of positive displacement due to the given cross section, especially when used in disk brakes in heavy vehicles, the brake pedal 20 must travel relatively long distances. From the following portion of the functional description it will become apparent how such disadvantageously long brake pedal paths can be avoided when brake boosting is in effect.

If the pressure supply apparatus 9 is shut on and sufficient pressure is available, then the pumping work required for braking is performed predominantly by the brake booster 2. In the basic position of the brake pedal 20, the restoring spring 29 causes the stop collar 26 to be axially spaced apart from the first booster piston 4, the control slide 27 to close the connecting bore 39, and the relief bores 32 and the outflow bores 40 to intersect with one another. As a result, the first booster chamber 33 communicates with the auxiliary chamber 35 via the compensation bores 30, the control slide 27, the relief bores 32 and the outflow bores 40. The auxiliary chamber 35, in turn, is pressure relieved via a connection 73, located near the end wall 34, and via a return line 74 beginning at the connection 73 and leading to the pressure supply apparatus 9. An actuation of the brake pedal 20 initially, via the tappet 7, causes a displacement of the control slide 27 such that the relief bores 32 are moved away from the outflow bores 40 and the control slide 27 closes the outflow bores 40. Subsequently as inflow bores 31 come into alignment with the connecting bore 39, so that pressure medium flows from the pressure supply apparatus 9 into the control slide 27 and through the compensation bores 30 into the first booster chamber 33. A partial quantity of the inflowing pressure medium flows through the line 49 into the second booster chamber 47. As a result, the first booster piston 4 and the second booster piston 6 are acted upon by boosting pressure. The surface area that is acted upon of the first booster piston 4 and the cross-sectional area of the first master cylinder piston 11 effect a first pressure translation ratio. The hydraulically effective areas of the second booster piston 6 and its pump piston 52 are matched to one another such that beginning with the boosting pressure, a larger pressure translation takes place than at the first master cylinder piston 11. This pressure translation ratio is for instance up to 10% or 20% greater than the first pressure translation ratio. In an intended manner, the result of this is that the pump piston 52 is capable of overcoming a higher counterpressure than the first master cylinder piston 11 can. As a result, the pump piston 52 attempts to overtake the first master cylinder piston 11, thereby striking the collar 72. Thus, in the event that boosting pressure is directed into the two booster cylinders 3 and 5, the collar 72 couples the pump piston 52 to the first master cylinder piston 11. If the boosting pressure rises further, these two pistons therefore move synchronously, and both of them in common positively displace pressure medium from the master cylinder 10 into the brake circuits I and II. Accordingly, it is clear that with the same stroke of the first master cylinder piston 11, more pressure medium is positively displaced into the brake circuits than in the first functional example described above; in which only the master cylinder piston 11 is moved. To generate a predetermined braking pressure in the brake circuits during brake booster operation, the first master cylinder piston 11 requires a shorter displacement path than during operation without brake boosting. Accordingly, the distance the brake pedal travels is also notably shorter. As already mentioned, the ratio between the short brake pedal travel during brake boosting and the longer brake pedal travel if brake boosting is absent is known as "translation jump".

Figure 2:
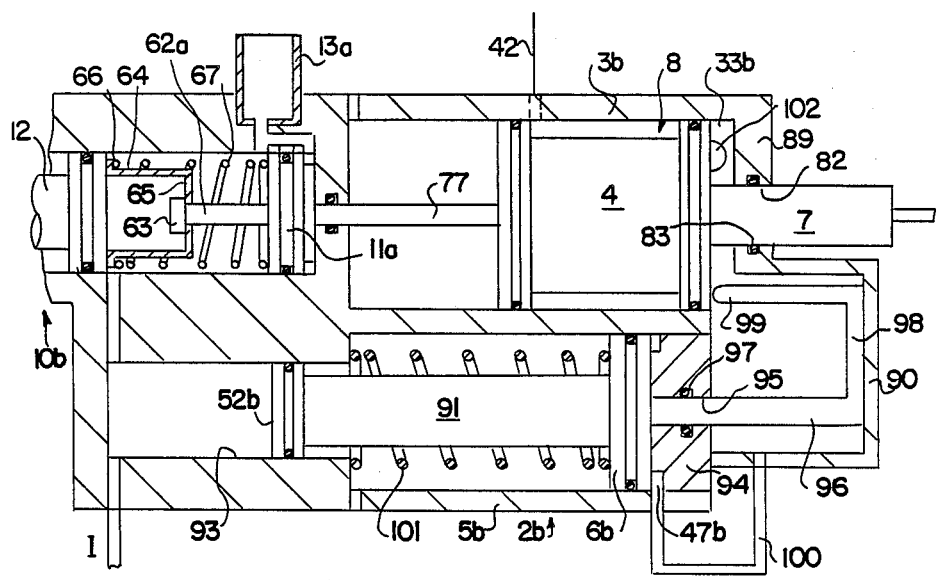

Another exemplary embodiment of a brake booster 2b as shown in FIG. 2 takes over the first booster piston 4, the tappet 7, the brake valve 8, the brake pedal 20, the brake pedal lever 21, the pedal rod 24 and the pressure rod 77 from the second exemplary embodiment of FIG. 2, described above. The first booster piston 4 is displaceable in a first booster cylinder 3b. Toward the brake pedal, this first booster cylinder 3b has an end wall 89, in which a bore 82 for guiding the tappet 7 is located. The tappet 7 is surrounded by a sealing ring 83. Below the tappet 7, the end wall 89 is shaped into a dome 90 toward the brake pedal 20. A second booster cylinder 5b extends parallel to and below the first booster cylinder 3b and receives a second booster piston 6b. Toward the master brake cylinder 10b, the second booster piston 6b is adjoined by a piston rod 91. The piston rod 91 is joined to a pump piston 52b. The pump piston 52b is surrounded by a pump cylinder 93. The hydraulically effective surface areas of the second booster piston 6b and the pump piston 52b are again matched to one another such that their boosting ratio is at least as great as at the first booster piston 4 and a master cylinder piston 11a associated with it, which is taken over from the second examplary embodiment. Toward the brake pedal, the second booster cylinder 5b has an end wall 94 with a bore 95. A coupling rod 96 is passed through this bore 95. A sealing ring 95 sealingly surrounds the coupling rod 96. The coupling rod 96 is firmly joined to the second booster piston 6b. Inside the dome 90, an arm 98 is rigidly joined to the coupling rod 96. The arm 98 is provided with a reentrant portion, as shown, this portion being bent at an angle and with its angled end 99, which is aligned parallel with the tappet 7, it points toward the first booster piston 4. A first booster chamber 33b inside the first booster cylinder 3b is associated with the first booster piston 4. A second booster chamber 47b communicates with the first booster chamber 33b, for instance via a line 100. A bore, not shown, which extends through the end wall 94, however, can be used instead of the line 100 to join the two booster chambers 33b and 47b to one another. A restoring spring 101 determines the basic position of the second booster piston 6b, in which this piston 6b rests on the end wall 94. The first booster piston 4 has a protrusion 102, which assures a minimum spacing between the booster piston 4 and the end wall 89. A spreader spring 67 disposed in the master brake cylinder 10b and a restoring spring, not shown, which presses upon the master cylinder 12 also taken over from the foregoing embodiment but not shown, have the effect that when the brake pedal 20 is not actuated, the protrusion 102 rests on the end wall 89. The pump cylinder 93 communicates with the brake circuit I.

MODE OF OPERATION OF THE OTHER EXEMPLARY EMBODIMENT

If the pressure supply apparatus 9 is not switched on or has failed, then the first booster piston 4, the pressure rod 77 and the first master cylinder piston 11a can be displaced by foot pressure exerted on the brake pedal 20. As a result, braking pressure can be generated in the brake circuit I and in a second brake circuit II, not shown. As in the first exemplary embodiment, relatively long pedal travel on the part of the brake pedal 20 is required to generate high braking pressures.

If the pressure supply apparatus 9 is providing sufficient pressure to the brake valve 8, then by actuating the brake pedal 20, which effects a displacement of the control slide 27 (not shown), boosting pressure can be directed into the first booster chamber 33b. The boosting pressure extends via a detour through the dome 90 and the line 100 into the second boosting chamber 47b. There, the second booster piston 6b is acted upon, and in order to raise the braking pressure it attempts to displace the pump piston 52b toward the master cylinder 10b. Because of the selection of boosting ratios already mentioned, the booster piston 6b, by being coupled via the coupling rod 96, the arm 98 and its end 99, displaces the first booster piston 4 toward the master brake cylinder 10b. Naturally in this process the force exerted by the end 99 upon the first booster piston 4 will be that force which in the event of brake boosting effects a synchronous displacement of both booster pistons 4 and 6b. If the brake pedal 20 is released, the effect is a pressure relief of the booster chambers 33b and 47b, so that both booster pistons 4 and 6b return to their starting positions, causing the braking pressures in the brake circuits I and II to drop.

The foregoing relates to preferred exemplary embodiments of the invention, it being understood that other variants and embodiments thereof are possible within the spirit and scope of the invention, the latter being defined by the appended claims.

I claim:

1. A brake booster having a first booster cylinder and a first booster piston disposed therein, at least one master cylinder, at least one master cylinder piston therein, said first booster piston adapted to displace said at least one master cylinder piston in said at least one master cylinder to supply at least one brake circuit, a tappet means for mechanical displacement of said first booster piston, a brake valve coupled to said first booster piston and said tappet, said brake valve adapted to direct boosting pressure into said first booster cylinder, a second booster cylinder and a second booster piston associated with said at least one master cylinder, said second booster piston arranged to be actuated by boosting pressure, a pump piston (52b) in a pump cylinder (93) which communicates with said at least one brake circuit, said pump piston being displaceable by a piston rod (91) joined to said second booster piston, said pump piston communicating with and generating braking pressure in said at least one brake circuit, said second booster cylinder and said pump cylinder (93) are disposed parallel to said first booster cylinder, and a coupling means affixed to said second booster piston, said coupling means further includes a bent arm having a terminal portion which contacts said first booster piston.

2. A brake booster as defined by claim 1, in which a pedal tappet means penetrates a first end wall connected with said first booster cylinder, said second booster cylinder includes a second end wall, said second end wall is provided with a bore, a coupling rod joined to said second booster piston, and further said pump cylinder is connected via a line to a master cylinder of said at least one brake circuit.

3. A brake booster having a first booster cylinder and a first booster piston disposed therein, at least one master cylinder, at least one master cylinder piston therein, said booster piston adapted to displace said at least one master cylinder piston in said at least one master cylinder to supply at least one brake circuit, a tappet means for mechanical displacement of said first booster piston, a brake valve coupled to said first booster piston and said tappet, said brake valve adapted to direct boosting pressure into said booster cylinder, a second booster cylinder and a second booster piston associated with said at least one master cylinder, said second booster piston arranged to be actuated by boosting pressure, said second booster piston and an associated pump piston are disposed in a pump cylinder and displaceable by a piston rod parallel with said first booster cylinder and have hydraulically effective surface areas which are matched to one another such that they have a larger boosting ratio than said first booster piston and its associated master cylinder piston, said pump cylinder communicates with said at least one brake circuit, coupling means affixed to said second booster piston and disposed between said first and said second booster piston, said coupling means includes a bent arm having a terminal portion which contacts said first booster piston such that a displacement, dictated by boosting action, of said second booster piston effects a displacement of the first booster piston to generate braking pressure in said at least one brake circuit.

4. A brake booster as defined by claim 3, in which said second booster piston has a boosting ratio of approximately 10 to 20% greater than a boosting ratio of said first booster piston.

* * * * *